UNITED STATES PATENT OFFICE.

FLORENTINE J. MACHALSKE, OF PHILADELPHIA, PENNSYLVANIA, ASSIGNOR OF ONE-HALF TO CHRISTOPHER OFFENHAUSER, OF PHILADELPHIA, PENNSYLVANIA.

PROCESS OF PRODUCING ELEMENTARY SILICON AND BY-PRODUCTS.

1,062,982. Specification of Letters Patent. Patented May 27, 1913.

No Drawing. Application filed May 13, 1912. Serial No. 697,060.

*To all whom it may concern:*

Be it known that I, FLORENTINE J. MACHALSKE, a citizen of the United States of America, and a resident of Philadelphia, county of Philadelphia, and State of Pennsylvania, have invented certain new and useful Improvements in Processes of Producing Elementary Silicon and By-Products, of which the following is a specification.

This invention has reference to a novel process of producing elementary silicon and by-products. This non-metallic element is never found in nature in the free state owing to its affinity to oxygen. It exists in nature very abundantly for instance in form of silicates in which the silicon is contained as silica, $SiO_2$. The silica in the silicates is combined for instance with aluminum oxid and water in the kaolin which thus is aluminous silicate. In other silicates the silica is combined with rare refractory oxids for instance tungstous oxids or molybdenous oxids or it may be in form of a compound containing cæsium.

The present invention has for its special purpose to produce simultaneously the elementary silicon and by-products by means of an electro-thermic process. The by-products thus obtained consist of such substances as are contained in the silicious compound used as a raw material. If for instance an aluminous silicate is used as a raw material such as kaolin, the by-product separated by the decomposition of the kaolin will be aluminum oxid or as it is usually called alumina. If rare refractory compounds are employed as the raw material such as silicious compounds of tungsten, molybdenum, cæsium or the like then the by-products consist of such oxids according to the natural raw product employed.

The kaolin in its pure state contains about one-half of silicon and of about one-half of aluminum plus oxygen and some molecular water. The empirical formula of the kaolin is:

$$Si_2O_9Al_2H_4$$

or the constitutional formula generally accepted is:

$$2SiO_2.Al_2O_3.2H_2O.$$

Accordingly there are 56.6 parts by weight of silicon and 54.2 parts by weight of aluminum contained in the molecule.

In carrying the novel process into effect the silicious compound is mixed with carbon in molecular proportion to such an extent that there is but sufficient carbon to combine with the oxygen of the silica only. It is evident that the raw material is to be previously analyzed for the purpose of determining the quantity of carbon to be mixed with the silicious compound. This proportionate percentage of the carbon relative to the silica contained in the molecule of the silicious compound results in keeping the other component part of the molecule intact which is one advantage of the process while a second advantage is the saving of power because one component part of the silicious compound is not decomposed.

The present process is carried into effect in a suitably constructed electric furnace. A commercial furnace preferably of the resistance type, is advantageously employed of about 100 K. W., from 20 to 50 volts at 2000 to 5000 amperes. This variance in the electric power is sufficient for practically all the silicious compounds used as a raw material.

In order to render the invention entirely clear same will be described now with kaolin as an example of the raw material employed. The kaolin in its anhydrous state contains about 120.6 parts of silica and about 102.2 parts of alumina in the molecule. A proportionate percentage of carbon is added to bind the oxygen of the silica of the kaolin only. The carbon employed is preferably pulverized coke which is free from sulfur. If a hydrous aluminous silicate is used same is made anhydrous by reducing it to powder by roasting and grinding same to drive off the molecular water before the addition of carbon is made. According to the molecular weight 222.8 parts of the silicious compound require 48 parts of carbon for the reaction which takes place in this instance in accordance with the following equation:

$$Al_2O_3.2SiO_2+4C=4CO+Al_2O_3+Si_2.$$

From the above equation it is apparent that elementary silicon results from the process while the oxygen of same passes off in form of carbon monoxid. The carbon mixed with the raw material is just sufficient to bind the oxygen of the silica contained in the raw material leaving thus the aluminum oxid intact. To start the reaction a small quantity of sodium chlorid and sawdust in proportions of about 1% of each is mixed with the furnace charge. This causes that the fusion of the alumina and the reduction of the silica propagates itself uniformly throughout the entire uniformly mixed charge. The duration of the process in the furnace is about one hour. While still in a liquid condition the resulting molten mass is separated into its constituent parts by subjecting the furnace with the molten mass to centrifugal action. In this manner the molten constituents are separated according to their specific gravities. While subjecting the molten mass to centrifugal action the current is allowed to pass continuously through same but at a somewhat reduced voltage just to keep the molten mass in a liquid condition so that a complete separation may be effected. Now the current is turned off and the centrifugal action stopped. The resulting separated products are then removed and constitute commercial products which may be further purified or not as desired.

In case an ore is employed as a raw material which is composed of other constituents than the kaolin referred to hereinbefore as an example, tungsten silicate for instance is worked up then the process results in the formation of elementary silicon and tungstous oxids according to the composition of this compound. Likewise other compounds are obtained as by-products when the silicious raw material contains same.

I claim as my invention:

1. The process of producing simultaneously elementary silicon and by-products from silicious compounds consisting in splitting up the silicious compound by electro-thermic fusion and subjecting the fused mass directly to centrifugal action.

2. The process of producing directly in a separate condition elementary silicon and by-products from silicious compounds consisting in splitting up the compounds by electro-thermic fusion and subjecting the fused mass directly to centrifugal action while allowing the current to pass at a voltage somewhat less than that used during the electro-thermic fusion of the said compounds.

3. The process of producing simultaneously elementary silicon and metallic oxids consisting in splitting up silicious compounds by electro-thermic fusion, and subjecting the fused mass directly to centrifugal action while allowing the current to pass at a voltage somewhat less than that used during the electro-thermic fusion of the said compounds, separating thus the silicon from the metallic oxids by specific gravity.

Signed at New York, N. Y., this 10th day of May, 1912.

FLORENTINE J. MACHALSKE.

Witnesses:
EMMA A. McCARRICK,
MARIE H. LEHR.